JOHN USTER.
Improvement in Picture Nails.
No. 125,859.  Patented April 16, 1872.
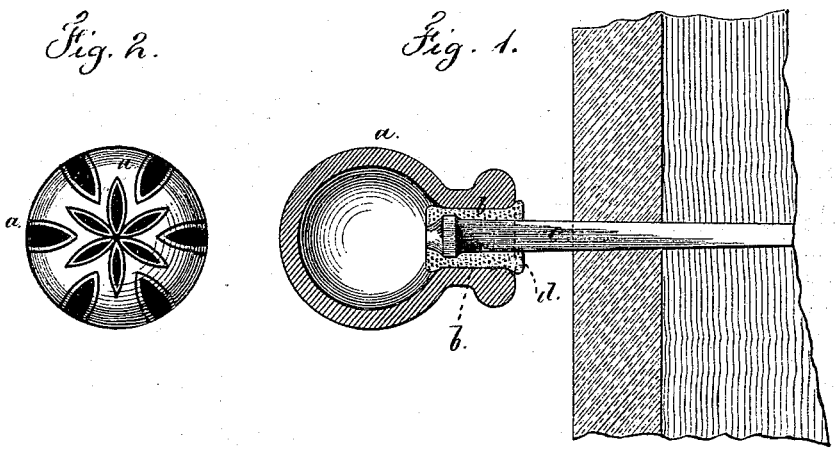
Witnesses
Geo. D. Walker
Chos. H. Smith
Inventor
John Uster
Lemuel W. Serrell
Atty 125,859

UNITED STATES PATENT OFFICE.

JOHN USTER, OF BROOKLYN, E. D., NEW YORK.

IMPROVEMENT IN PICTURE-NAILS.

Specification forming part of Letters Patent No. 125,859, dated April 16, 1872.

*To all whom it may concern:*

Be it known that I, JOHN USTER, of Brooklyn, E. D., in the county of Kings and State of New York, have invented and made an Improvement in Picture-Nails; and the following is hereby declared to be a full and exact description of the same.

The object of my invention is to provide a device by which an ornamental head may be firmly secured to any of the usual forms of nails or screws without requiring such nails or screws being in any way changed from their usual construction to adapt them to receive said ornamental heads; and it consists in the use of a removable head, provided with a neck or tubular socket at its rear to receive the head or outer end of the nail or screw; and this socket is somewhat larger than the nail or screw head, so that a short piece of rubber tubing placed around the head of the nail and compressed within said opening or socket will, by its expansion, firmly hold the ornamental head upon the nail or screw.

In the drawing, Figure 1 is a vertical section of the removable head secured in place upon an ordinary nail, and Fig. 2 is a front view of said head.

$a$ represents the removable head; and this may be of the desired size and shape, and be made of any suitable material, such as wood, glass, metal, or other material, and may be ornamented in any desired manner. When the head $a$ is of glass the same may be made hollow, as shown in Fig. 1, and the interior may be silvered or colored to give the desired ornamental appearance to the head. This head $a$, at its rear, is made with an opening, hole, or socket, $b$, of a little larger diameter than the heads of ordinary-sized nails and screws, and of a depth to insure a firm bearing for said head upon the end of the nail $c$ when secured thereto by the short rubber tube $d$. This rubber tube may first be placed in the hole or socket $b$, and then pressed upon the head of the nail or screw; or said tube may be passed over the head or end of the nail and the head $a$ forced upon the same. In either case the rubber is compressed within the socket and around the nail, and, by its expansion, securely holds the head $a$ to the nail or screw. By varying the thickness of the rubber tube the head $a$ will be adapted to different-sized nails or screws.

I claim as my invention—

The picture-nail head, having a hollow neck or socket adapted to receive an ordinary nail or screw, the head of which is surrounded by a short piece of India-rubber tubing, interposed to hold the ornamental head in place, as described.

Signed by me this 2d day of March, A. D. 1872.

JOHN USTER.

Witnesses:
GEO. T. PINCKNEY,
CHAS. H. SMITH.